May 29, 1928.  1,671,573
E. ERLENBACH
PROCESS FOR CATALYTIC CRACKING OF HEAVY HYDROCARBONS, MINERAL OILS,
OIL RESIDUE, TARS, AND THE LIKE
Filed Aug. 15, 1922
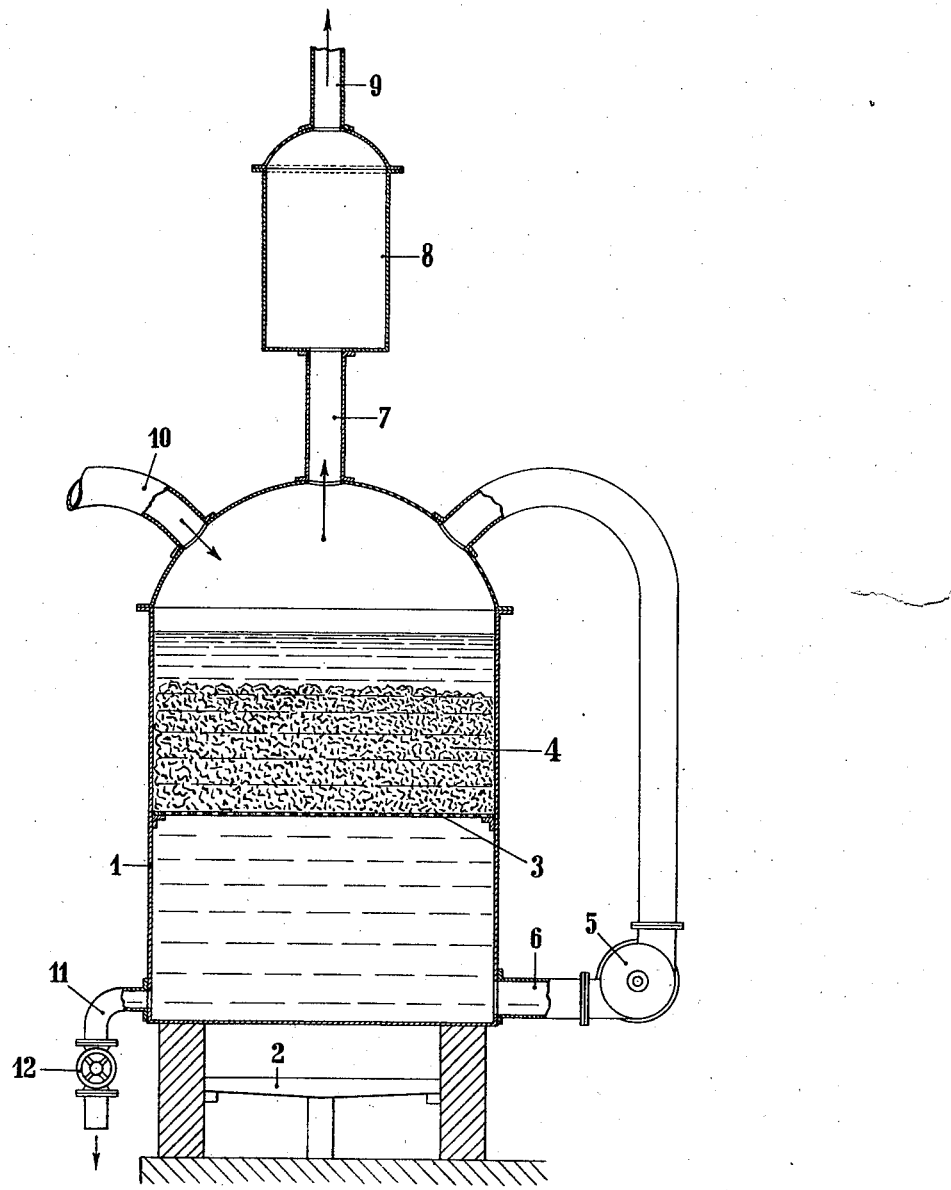
Inventor:
Edgar Erlenbach
by
Byrnes Townsend & Bruckenstein Patented May 29, 1928.

1,671,573

UNITED STATES PATENT OFFICE.

EDGAR ERLENBACH, OF BERLIN, GERMANY, ASSIGNOR OF ONE-FOURTH TO SINCLAIR REFINING COMPANY, OF CHICAGO, ILLINOIS, A CORPORATION OF MAINE.

PROCESS FOR CATALYTIC CRACKING OF HEAVY HYDROCARBONS, MINERAL OILS, OIL RESIDUE, TARS, AND THE LIKE.

Application filed August 15, 1922, Serial No. 582,048, and in Germany September 22, 1921.

It it known that heavy hydrocarbons, mineral oils, oil residues, tars and the like may be cracked by heating them with or without catalyzers at atmospheric or higher pressure into lighter products having lower boiling points. Among the catalyzers known to be useful for this purpose are metallic, basic, acid and chemically neutral substances having a great physical absorption capacity. The following may be mentioned as examples: metals such as iron and nickel; alkalies such as burnt lime; metal chlorides such as aluminium chloride; silicic acid compounds such as pumice, diatomite and hydrosilicates; and materials such as powdered coke and activated carbon, the latter being a charcoal of especially good surface activity, produced by charring wood in the presence of suitable chemicals.

In these known processes the hydrocarbons to be cracked are heated with the catalyzer in a still to a definite high temperature depending upon the nature of the hydrocarbons. When hydrocarbons which boil at temperatures lower than their cracking temperatures are treated, the heating is carried out under pressure.

A disadvantage of these known processes is that the excessive heating of the oil on the heated walls of the still causes coking which makes it necessary to remove coke deposits from time to time or even continuously. Moreover, there is no assurance that all of the oil under treatment comes into intimate contact with the catalyzer. The use of stirring means for the purpose of securing the desired intimate contact of the oil with the catalyzer requires a considerable expenditure of power.

According to the present invention the formation of coke is avoided and all the oil is forced to come into intimate contact with the catalyzer by placing the catalyzer in a fairly deep layer on a perforated support within the still and circulating the oil repeatedly through it.

In the annexed drawing a still suitable for use in carrying out the process is shown diagrammatically.

1 is a still which is heated by a furnace 2. The catalyzer is arranged as a deep layer 4 on the screen 3. The oil is circulated by means of pump 5 and pipe 6. The vapors produced pass through the pipe 7 into the dephlegmator 8 and are discharged through a pipe 9. Raw material is supplied through an inlet pipe 10 and undistilled residue is discharged through a pipe 11 controlled by valve 12

An example of the process in accordance with the invention is as follows:—

About 4000 kg. of paraffin having a melting point of 51° C. are supplied to the still 1 in which about 675 kg. of activated carbon are arranged on the sieve 3. The paraffin is heated at atmospheric pressure to a temperature of 350–380° C. and is repeatedly passed through the catalyzer by the operation of the pump 5. The vapors produced pass through the dephlegmator 8. Fresh paraffin is supplied through the pipe 10 as required and residue discharged through the pipe 11. A transparent distillate of a specific weight of 0.755 and having a relatively low boiling point is obtained in a yield of about 50–80% of the paraffin consumed. The residue which is finally discharged from the still consists, after cooling, of a viscous, oily portion and a solid portion having a relatively higher congealing point. The paraffin of the above example may be replaced by crude oil residues, deprived of benzine, of any origin and with or without any content of paraffin or the like.

It is not new, for example, during the cracking of hydrocarbons to cause a circulation of oil in heated tubes, for the purpose of removing coke particles. However, hitherto the formation of coke has not been avoided by employing catalyzers known per se and by forcing all of the oil or other hydrocarbons to pass repeatedly through a catalyzer layer.

Having now particularly described and ascertained the nature of my said invention and in what manner the same is to be performed, I declare that what I claim is:—

1. Process for the cracking of heavy hydrocarbons, mineral oils, oil residues, tars and the like in a still having a body of catalytic material extending entirely across the still and dividing the liquid body, which comprises maintaining a liquid body in the still at a cracking temperature, withdrawing the liquid from below the catalytic body and returning it above the catalytic body whereby all of the liquid is circulated through the catalytic body.

2. Process for the cracking of heavy hydrocarbons, mineral oils, oil residues, tars and the like in a still having a body of active carbon extending entirely across the still and dividing the liquid body, which comprises externally heating a liquid body in the still to cracking temperature, withdrawing the liquid from below the body of active carbon, and returning it above the body of active carbon whereby all the liquid is circulated through the body of active carbon.

In testimony whereof, I affix my signature.

Dr. EDGAR ERLENBACH.